Patented Feb. 12, 1929.

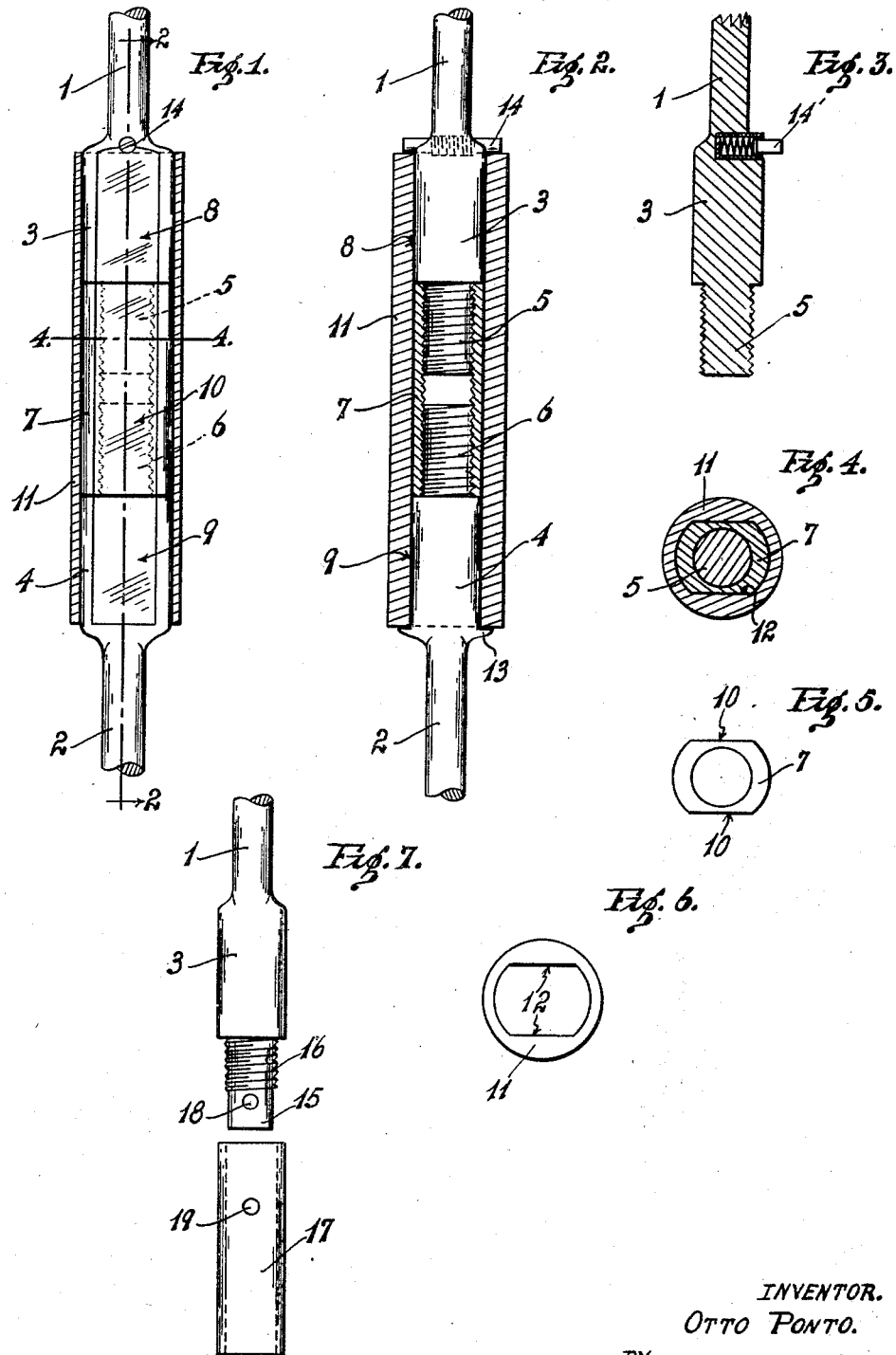

1,701,985

UNITED STATES PATENT OFFICE.

OTTO PONTO, OF LONG BEACH, CALIFORNIA.

COUPLING LOCK.

Application filed March 18, 1926. Serial No. 95,620.

In the pumping of deep wells the sucker rods whip about due to their great length, which causes unthreading of the joints and parting of the line. The same is true of tubing; rotary drill pipe and the like, and standard drilling strings.

An object of my invention is to provide a lock whereby the sections of sucker rods, tubing, pipe and the like can not unscrew.

Another object is to provide a lock which may be readily removed when desired.

Further objects are to provide a lock which is simple in construction, inexpensive to manufacture and effective in operation.

Other objects, advantages and features of invention may appear from the accompanying drawing, the subjoined detailed description and the appended claims.

In the drawing illustrating my invention.

Fig. 1 is a fragmentary side elevation of a sucker rod joint with the locking sleeve shown in section thereon.

Fig. 2 is a partial sectional view taken on line 2—2 Fig. 1.

Fig. 3 is a fragmentary sectional view of a modified form of locking pin.

Fig. 4 is a sectional view taken on line 4—4 Fig. 1.

Fig. 5 is a plan view of the coupling box.

Fig. 6 is a plan view of the locking sleeve.

Fig. 7 is a disassembled view of a modified form of a sucker rod pin and coupling box.

Referring more particularly to the drawing,—the sucker rods 1, 2 are provided with coupling enlargements 3, 4 on the adjacent ends thereof. Threaded pins 5, 6 extend from the enlargements 3, 4 respectively, and screw into a box 7.

The enlargements 3, 4 are each provided with flat faces 8, 8 and 9, 9 respectively, and the box 7 is formed with flat faces 10, 10. The faces 8, 9, 10 are in alinement when the pins 5, 6 are screwed into the box 7.

A coupling sleeve 11 fits over the enlargements 3, 4 and box 7, and is provided with longitudinally extending flat faces 12, 12 which fit against the alined faces 8, 9, 10 thus preventing relative rotation and unscrewing of the sucker rods and box.

The rod 2 is provided with a seat 13 on which the sleeve 11 rests, which seat prevents the downward movement of said sleeve. To prevent upward movement of the sleeve a locking pin 14 is provided. This pin may be a set screw, as shown in Figs. 1 and 2; extending through the rod 1 and threaded therein, or a yieldable pin 14 may be provided as shown in Fig. 3. By removing the pin 14 and sleeve 11 the joint may be uncoupled.

In Fig. 7, I have shown a slightly modified form of threaded joint. The lower part 15 of the pin 16 is not threaded and acts as a guide to insert the pin into the box 17. Alined holes 18, 19 are provided in the box 17 and pin 16 respectively through which holes a locking pin is adapted to extend.

Having described my invention I claim:

1. A tool joint comprising a pair of members, threaded pins extending from said members, a box into which said pins are threaded, a sleeve surrounding said box, one of said members having a shoulder on which one end of said sleeve rests, and a yieldable locking pin projecting from the other member and engaging the other end of said sleeve.

2. A tool joint comprising a pair of members, threaded pins extending from said members, a box into which said pins are threaded, alined flat faces on said members and box, a sleeve surrounding said box, said sleeve being formed with flat faces on the inner surface thereof adapted to engage said first named flat faces, a shoulder on one of said members against which said sleeve is adapted to rest, and a spring actuated pin extending from the other member adapted to bear against the opposite end of the sleeve to prevent end-wise movement thereof.

In testimony whereof I affix my signature.

OTTO PONTO.